Jan. 3, 1928.
P. M. MILLER
DEMOUNTABLE RIM
Filed June 22, 1921
1,654,744
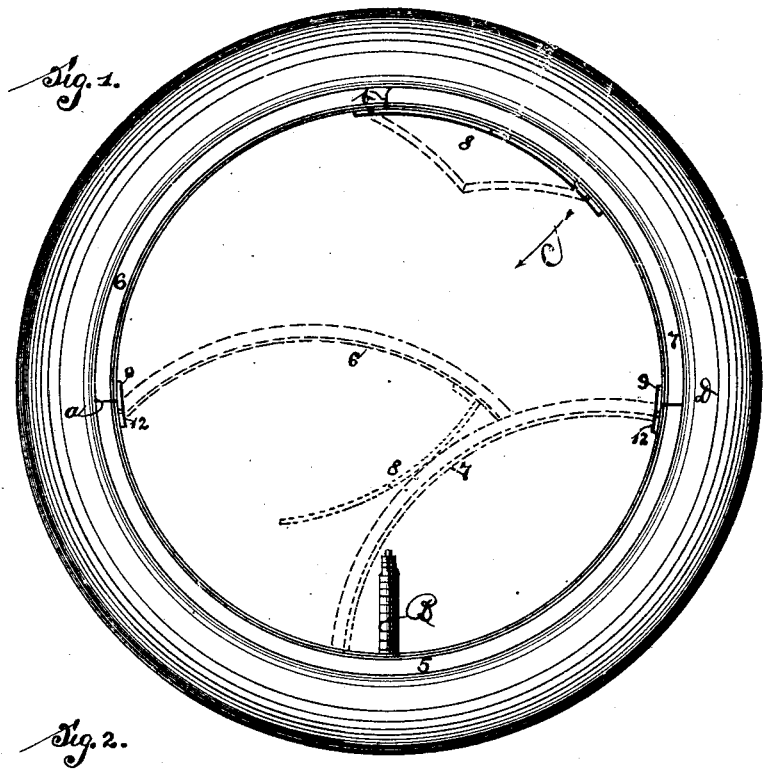
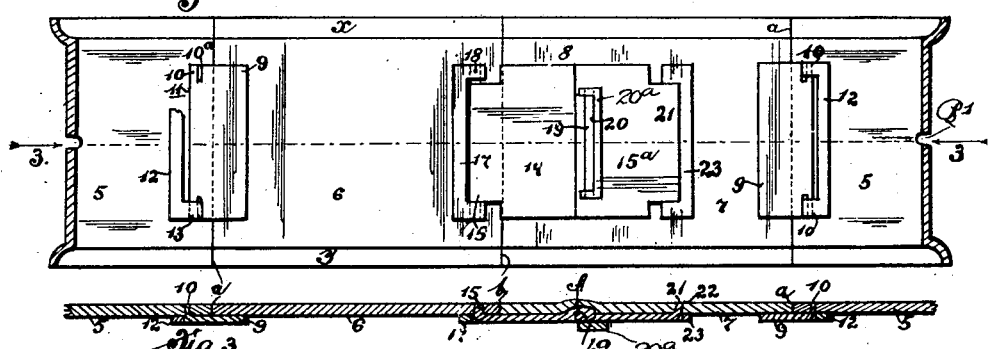
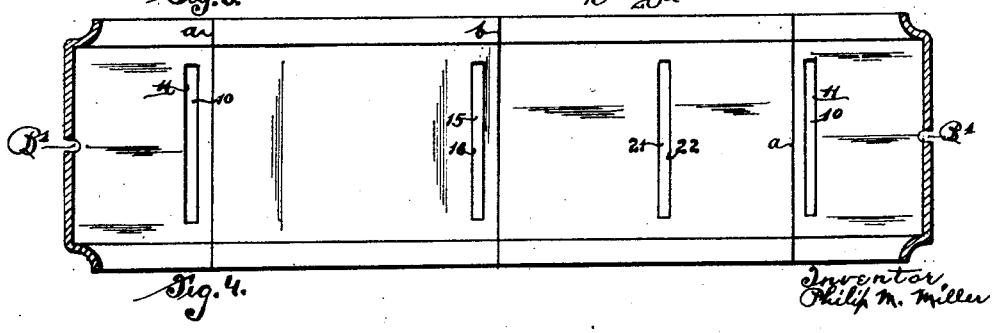

Patented Jan. 3, 1928.

1,654,744

UNITED STATES PATENT OFFICE.

PHILIP M. MILLER, OF BROOKLYN, NEW YORK.

DEMOUNTABLE RIM.

Application filed June 22, 1921. Serial No. 479,557.

My present invention has reference, in its broad aspect, to improvements in demountable rims, and more particularly it is my purpose to provide a rim which may be readily set up in an operative position with respect to a tire carried thereby, and with respect to the wheel to which the rim is applied; and which may be quickly and conveniently removed from the wheel and collapsed to release the tire. To this and other ends I have provided improved means for holding the elements of a segmental rim firmly in an operative position with respect to a tire, such means being completely effective to resist any tendency of the segments or sections of the rim to break or spring apart when in use upon a wheel to which it is applied, although when the rim is removed from the wheel a simple operation only is necessary to collapse the segments or sections and remove the rim from the tire.

Among the principal advantages of my invention may be briefly defined the following; first, the sections or segments of my rim, when set up, form a perfect circular structure, the tire engaging surface of which is free from indentations or elevations; second, mere bouncing of the tire when deflated is sufficient to remove the rim, and mere pressure of the foot upon my improved toggle member is sufficient to assemble my rim on a tire; third, the sections of my rim resist any tendency to break apart or collapse when in use, and are free from lost motion or looseness between the sections; fourth, edgewise displacement of the sections one with respect to the others is prevented, and fifth, the number of parts is reduced to a minimum with consequent saving in cost of manufacture.

The structural elements employed to accomplish the above and other results and objects will be hereinafter more fully described in detail and specifically pointed out in the claims appended hereunto and forming a part of this specification.

In the drawings wherein is shown an embodiment of my invention:—

Figure 1 is a side elevation of my rim showing a tire mounted thereon, and illustrating in dotted lines the positions of the sections and toggle when collapsed.

Figure 2 is a plan view and development of my rim showing its inner periphery, same being partly in section, Figure 3 is a section taken on the line 3—3 of Figure 2 looking in the direction of the arrows, and Figure 4 is a view similar to Figure 2 showing the outer periphery or tire seating surface of the rim.

Like characters of reference are used to designate like or similar parts throughout the several views of the drawings.

In forming the circular body which constitutes my tire rim a plurality of sections or segments are utilized. In my present embodiment three sections form the rim and are designated (5), (6) and (7), each being arcuate and doubly flanged. The section (5) is the longest section and is somewhat less than 180° of a circle, and is termed the main section. The remaining sections (6) and (7) complete the balance of the circular rim when set up.

Each section is provided on its respective peripheral edges with a flange, designated X and Y. The portion between the flanges constitutes the channel in which the tire D is seated. The section (5) is formed with an opening B' for receiving the inflating stem of the inner tube of the tire mounted on the rim.

In order to form a permanent hinge connection between the ends of section (5) and the adjacent ends of sections (6) and (7), a transverse slot (11) is provided in each of the ends of section (5), into which is adapted to fit the latterally bent T-shaped head (10) of a plate (9), one of which is attached to the adjacent end of each of the sections (6) and (7). In order to permanently hold the heads (10) in the slots (11) to form the permanent hinge connection, a plate (12) is secured, as by spot-welding, to each of the respective ends of section (5) with the end extensions (13) of the plates (12) engaging in the necks (10ª) of the T-shaped heads of the plates (9) thereby to confine the same in the slots (11) to prevent their withdrawal. By these means the respective permanent hinge joints $a$ are attained without forming indentations or elevations in the tire engaging surface of the rim since the heads (10) seat in the slots (11) flush with the tire engaging surface of the rim. Furthermore when the rim is set up a firm bearing is provided between the sections which lends to the attainment of a rigid structure free from lateral play.

The free ends of sections (6) and (7) are adapted to be connected together when the rim is set up by a toggle arrangement designated generally by the numeral (8). The toggle (8) is formed with a pair of plates (14) and (15ª). The plate (14) is permanently and hingedly connected with the section (6), while the plate (15ª) has a detachable connection with the section (7). The hinge connection between the plate (14) and section (6) is similar to that above described for hingedly connecting the sections (6) and (7) with the section (5). To this end a slot (16) is provided in the free end of section (6) into which is received the T-shaped head (15) of the plate (14). A plate (17) is positioned with its end extensions (18) in the neck portion of the T-head to form the permanent hinged connection. The joint b between sections (6) and (7) is bridged by the toggle to dispose the end of the toggle plate (15ª) in position for reception in a slot (22) in plate (7) in the manner which will be hereinafter described. The permanent hinge connection between the toggle plates (14) and (15ª) is formed by seating the T-shaped head (19) of plate (14) in slot (20) of plate (15ª) where it is permanently retained by a plate (20ª) after the manner heretofore described in conjunction with the hinge connection of the toggle (8) with the section (6). However the interconnected ends are curved to conform to a seat A in the section (7) so that a smooth surface will be provided in assembly. The free end of the plate (15ª) is provided with a head 21 which is adapted to enter a slot (22) of section (7), and a plate (23) is provided about the slot 22 against which the end of the plate (15ª) abuts to retain the end in position to form a detachable connection.

From the foregoing it will be apparent that for removing the tire the same is first deflated and the toggle placed in the position shown in Figure 1 in dotted lines. In this position the toggle will be broken in the direction of the arrow C when the tire is bounced on the ground whereupon the section (7) will move inwardly followed by the section (6) and the toggle assembly. To replace the tire on the rim the sections are arranged on the tire with the toggle toward the ground and with the head (21) in slot (22) whereupon pressure of the foot on the toggle will force the same into operative expanded position and will complete the circumferential alignment of the sections and toggle to the end that the rim will be properly assembled to retain the tire thereon.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:—

1. A tire rim comprising pivoted segments each provided with an aperture adjacent its free end, and toggle members formed with a head secured in the aperture of one segment to provide a fixed pivot and a foot to detachably interlock with the aperture in the abutting segment and freely separable therefrom.

2. A tire rim comprising pivoted segments each provided with an aperture adjacent its free end, toggle members having an elongated pivot and slot connection, a pivoting head upon one of said members disposed in the aperture of one segment, a plate upon said segment for securing said head against removal to form a fixed pivot, and an angularly disposed foot upon the other toggle member adapted to detachably engage the aperture in the abutting segment.

PHILIP M. MILLER.